United States Patent [19]

Gunschmann

[11] 3,990,110

[45] Nov. 2, 1976

[54] TAPE GUIDING DEVICE FOR A MAGNETIC INSTRUMENT

[75] Inventor: Peter Gunschmann, Darmstadt, Germany

[73] Assignee: Robert Bosch Fernsehanlagen G.m.b.H., Darmstadt, Germany

[22] Filed: Aug. 14, 1975

[21] Appl. No.: 604,626

[30] Foreign Application Priority Data

Aug. 30, 1974 Germany............................ 2441663

[52] U.S. Cl. ................................. 360/84; 360/130
[51] Int. Cl.² ...................... G11B 5/52; G11B 21/04; G11B 15/60
[58] Field of Search ............................ 360/130, 84

[56] References Cited
UNITED STATES PATENTS

| | | | |
|---|---|---|---|
| 3,319,014 | 5/1967 | Sugawa............................ | 360/130 |
| 3,333,753 | 8/1967 | Streets............................. | 360/130 |
| 3,404,241 | 10/1968 | Streets et al..................... | 360/130 |
| 3,691,315 | 9/1972 | Ellmore........................... | 360/84 |

Primary Examiner—Robert S. Tupper
Attorney, Agent, or Firm—Ernest F. Marmorek

[57] ABSTRACT

A magnetic tape guiding device for use in a magnetic tape instrument having a magnetic tape, a supply reel for supplying the magnetic tape, a drum arrangement including a rotary magnetic head arrangement disposed in a drum having a transverse division for the recording and playback of the magnetic tape, and a take-up reel for receiving the magnetic tape; the magnetic tape having a path extending from the supply reel to the drum where it follows a helical path along the circumference of said drum for about 180°, and then to the take-up reel; the device featuring first and second cylindrical vertical level equalizing elements disposed in the path of the magnetic tape on opposite sides of the drum, the elements being axially askewed with respect to the drum, oppositely offset with respect to the division in the drum and each being disposed tangent to a plane tangent to said drum, the path of the magnetic tape having a portion extending along the circumference of each element for about 180°, the reels being disposed at substantially the same level and substantially at the same level as the division.

2 Claims, 3 Drawing Figures

TAPE GUIDING DEVICE FOR A MAGNETIC INSTRUMENT

BACKGROUND OF THE INVENTION

The invention relates to a magnetic tape guiding device for use in a magnetic tape instrument having a helical guidance of the magnetic tape around a scanning device.

Magnetic tape instruments having a helical guidance device are used preferentially for the recording and playback of wideband signals, such as video signals. In such instruments, the magnetic tape is disposed around a transversally divided drum arrangement, in the division plane of which a magnetic head arrangement with one or more magnetic heads revolve inside to interact with the magnetic tape, so that the signals are recorded on the magnetic tape in a sequence of diagonal traces.

In order to be able to record a continuous sequence of signals without any gaps, it is necessary that at any given point in time at least one magnetic head of the magnetic head arrangement interacts with the magnetic tape.

In the case of a magnetic tape instrument with one recording, or playback head on the head-wheel, it is necessary that the magnetic tape be wound around the drum arrangement through an angle of about 360°. If the head wheel includes two magnetic heads which are displaced by about 180° with respect to one another, the gapless recording of the signals is obtained by having the tape disposed around the drum through an angle of 180°.

In order to utilize most of the recording surface of the magnetic tape, the tracks on the magnetic tape extend as much as possible from one edge of the magnetic tape to the opposite lying one, so that as much information as possible can be recorded per track segment. For certain case, auxiliary tracks and sound tracks are provided at one edge of the magnetic tape or at both edges. For maximum utilization of the recording surface on the magnetic tape in the case of a magnetic tape instrument with a single magnetic head, the magnetic tape is usually wound around the drum arrangement at a flat angle, whereas in the case of a magnetic tape instrument with two or more magnetic heads displaced at equal angles with respect to each other, the helical path of the magnetic tape around the drum arrangement becomes steeper. In each case, a vertical level displacement, approximately equal to the width of the magnetic tape, appears between the incoming and outgoing portions of the magnetic tape with respect to the drum arrangement.

This difference in vertical displacement between the incoming and outgoing portions of the magnetic tape makes the design of the instrument difficult as well as its construction and operation.

In general, it is preferable to have the drum arrangement and the tape guiding elements for the drawing and the transporting of the magnetic tape with their axes parallel to each other and perpendicular to a common base plate. For the base plate, a flat construction is preferred because it can be produced and machined relatively easily. As a result of the above mentioned vertical level displacement, e.g. the incoming magnetic tape end moves directly above the base plate towards the drum arrangement, whereas the outgoing magnetic tape end, after re-orientation is guided away in a plane tangent to the drum arrangement which is vertically higher from the base plate. Accordingly, the take-up reel must be arranged in a vertically displaced position with respect to the supply reel, the same applying to the guiding elements associated with the guidance of the in-going and out-going magnetic tape portions. Such an arrangement complicates the insertion process. In particular, it renders it difficult to use a fully automatic threading device.

There are known magnetic tape instruments designed to eliminate the aforementiond disadvantages by having the drum arrangement skewed with respect to the base plate so that the incoming and the outgoing magnetic tape portions exhibit the same vertical position with respect to the base plate. This arrangement has the serious disadvantage that the driving device for the magnetic head arrangement must likewise be inclined with respect to the base plate, thereby greatly impeding the transmission of the required angular forces, from the head arrangement to the reels or the reverse by means of simple belt drives. In the case of a multimotor arrangement, that is, separate drive motors for the magnetic head arrangement and the reels, these difficulties do not exist, but such embodiments are relatively expensive.

Generally, one drawback in such magnetic tape instruments is that the magnetic tape must run through the guiding device and the drum arrangement with a high degree of accuracy in order to guarantee the reproducibility of the recorded signals and that simultaneously any kind of localized or one-sided stretching must be avoided in order to eliminate permanent deformations which could adversely affect the playback capability of the magnetic tape.

From the DT-PS No. 1,175,726 (corresponding to the U.S. Pat. No. 3,159,501) a device is known for the guidance of a magnetic tape in a magnetic tape instrument having a rotary head arrangement with two magnetic heads displaced by 180° with respect to one another. In this instrument, the portion of the magnetic tape which is in operating in connection with the rotary head arrangement encircles approximately half the circumference of the drum arrangement. This device for the guidance of the magnetic tape includes an external tape guiding system with two rounded guide members which are axially displaced with respect to each other and each is disposed tangent to a respective plane tangent to the drum arrangement. In this manner, the magnetic tape runs outside of the guide members in planes which are perpendicular with respect to the axis of the drum arrangement, so that the axes of the supply and take-up reels can be arranged parallel to the axis of the rotary head arrangement. This arrangement permits the axis-parallel arrangement of the take-up, and supply reels, as well as of drum arrangement and rotary head, yet it does not eliminate the disadvantages of the vertical position displacement of the incoming and outgoing magnetic tape as they relate to the threading-in process such as one with automatic threading.

SUMMARY OF THE INVENTION

It is the object of the invention to provide an improved device for the guidance of the magnetic tape within magnetic tape instruments of the aforementioned type wherein, in addition to the axis-parallel arrangement of the drum arrangement and of the reels, the reels are in the same plane parallel to the base plate.

One of the principle objects of the invention is a magnetic tape guiding device for use in a magnetic tape instrument having a magnetic tape, a supply reel for supplying the magnetic tape, a drum arrangement including a rotary magnetic head arrangement disposed in a drum having a transverse division for the recording and playback of the magnetic tape, and a take-up reel for receiving the magnetic tape; the magnetic tape having a path extending from the supply reel to the drum where it follows a helical path along the circumference of said drum for about 180°, and then to the take-up reel; the device featuring a first and second cylindrical vertical level equalizing elements disposed in the path of the magnetic tape, on opposite sides of the drum, the elements being axially askewed with respect to the drum, oppositely offset with respect to the division in the drum and each being disposed tangent to a plane tangent to said drum, the path of the magnetic tape having a portion extending along the circumference of each element for about 180°, the reels being disposed at substantially the same level and substantially at the same level as the division.

Further objects and advantages of the invention will be set forth in part in the following specification and in part will be obvious therefrom without being specifically referred to, the same being realized and attained as pointed out in the claims hereof.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

In carrying the invention into effect, one of the embodiments has been selected for illustration in the accompanying drawings and for description in this specification. Reference is had to the FIGS. 1 to 3.

Figure 1:
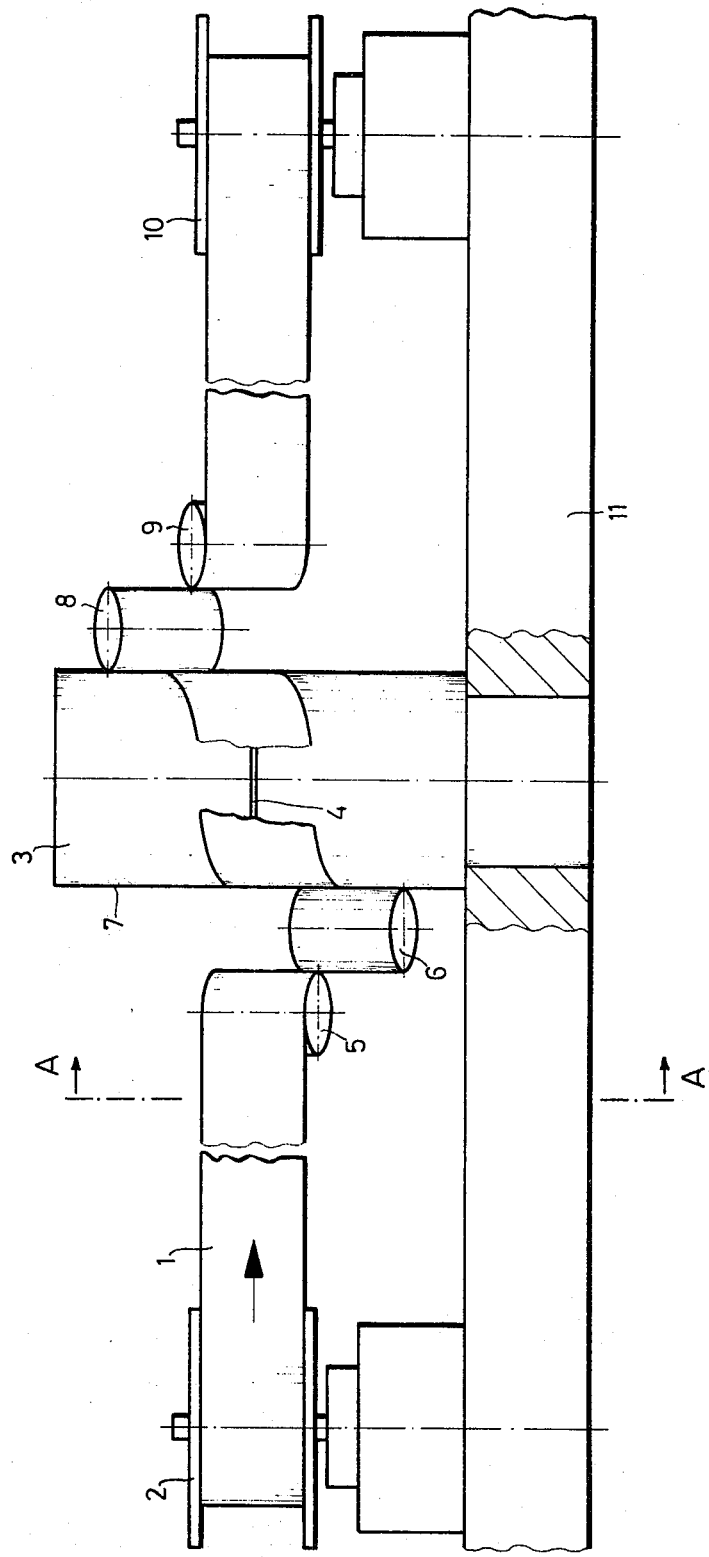
FIG. 1 is a side elevation view of a tape guiding device according to the invention.

In FIG. 1, the magnetic tape 1 is taken off from the supply reel 2 in the direction toward the drum arrangement 3. At reference point 4, the drum exhibits a dividing slit in which a rotary head arrangement having two magnetic heads displaced by 180° with respect to one another moves (the rotary head arrangement is not shown in the drawing). The magnetic tape 1 is reoriented by 90° by a first re-orientation element 5 and fed to a first vertical level equalizing element 6, where it is re-oriented by 180° and is fed tangentially to the cylindrical guide-surface 7 of the drum arrangement 3. The re-orientation element 5 as well as the vertical level equalizing element 6 both possess a cylindrical shape and the axes of the elements 5 and 6 are skewed with respect to the axis of the drum arrangement 3.

The magnetic tape 1 winds itself around the drum arrangement 3 through an angle of 180° along a helical path and is tangentially pulled away from the drum arrangement 3 to the second vertical level equalizing element 8. After re-orientation around element 8 by 180°, the magnetic tape 1 winds around the second re-orientation element 9 by 90° and is fed to the take-up reel 10 for the uptake of the tape 1 modified on drum arrangement 3.

Figure 2:
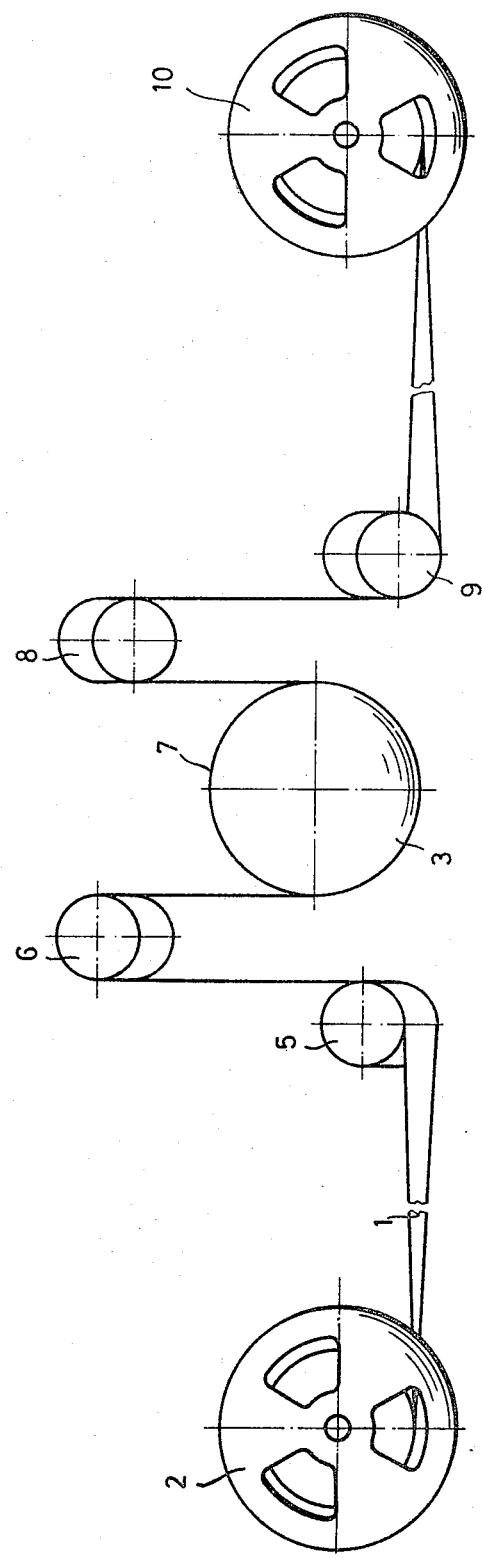
FIG. 2 is a top view of FIG. 1.

In FIG. 2, it can be readily seen that the magnetic tape 1 from the supply reel 2, moves to the element 5 to the element 6, from where it is fed tangentially to the drum arrangement 3 and then winds itself helically through an angle of 180°. Subsequently, the magnetic tape 1 is pulled-off from the drum arrangement 3 in direction of the element 8 and after winding itself around the element 8 through an angle of 180° it is re-oriented by the element 9 by 90° and wound-up on take-up reel 10.

Figure 3:
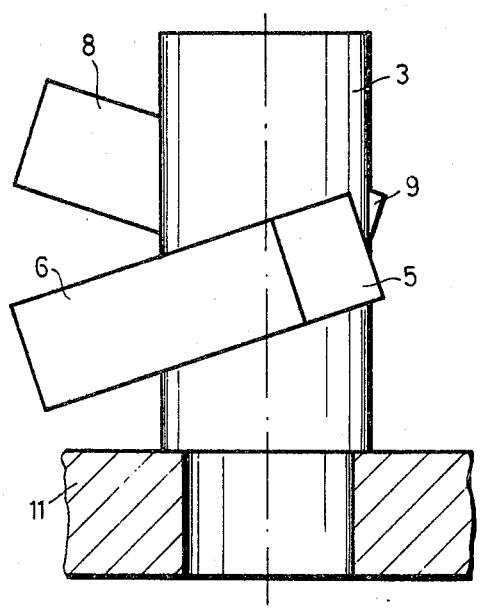
FIG. 3 is a sectional view along line A—A of FIG. 1.

In FIG. 3, the relative positions of the elements 5,6,8, and 9 with respect to each other and the drum arrangement 3 can be seen.

The advantageous mode of operation of the tape guiding device according to the invention results from the special tape guidance around the vertical level equalizing elements 6 and 8. Due to the cylindrical shape of the vertical level equalizing elements 6 and 8 and the 180° re-orientation, the magnetic tape 1 is guided back again in each case in the direction of the tape portions near the reels 2 and 10 and tangentially rolled-up onto the drum arrangement 3 or rolled-off the same. As it can be recognized in particular from FIG. 3, the center lines of these tape portions cross one another in a plane which is parallel to the plane of base plate 11. Furthermore, due to the fact that the re-orientation elements 5 and 9 are arranged in such a manner so that they are tangent with respect to the tape segment coming from the supply reel and with respect to the tape segment running toward the take-up reel 10, the tape segments intersect this plane at the height of near the middle between the vertical level equalizing elements 6 and 8. The arrangement of the supply reel 2 and the take-up reel 10 at this vertical level becomes also possible as a result of this. Thus, the aim of the invention, namely the arrangement of both reels at the same vertical level, without detrimental localized stresses and strains for the tape, is achieved.

Through variations of the axial distances of the elements 5 and 9 with respect to the elements 6 and 8, it is possible to select the position of the reels 2 and 10 above the base plate 11. In each case, the advantage is maintained that both reels can be arranged at the same vertical level, which is of particular importance in cases of magnetic tapes assembled in cassettes.

It is also possible to attain the aim of the invention, namely the arrangement of the reels at the same vertical level above the base plate 11 by eliminating elements 5 and 9 and positioning reels 2 and 10 at their respective vertical heights above the base plate 11.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. A magnetic tape guiding device for use in a magnetic tape instrument having a magnetic tape, a supply reel having an axis for supplying said magnetic tape, a drum arrangement including a rotary magnetic head arrangement disposed in a drum having an axis and having a transverse division for the recording and playback of said magnetic tape, and a take-up reel having an axis for receiving said magnetic tape; said magnetic tape having a path extending from said supply reel to said drum where it follows a helical path along the circumference of said drum for about 180°, and then to said take-up reel, the axes of said reels and said drum being substantially parallel to each other; said device comprising:

first and second cylindrical vertical level equalizing elements disposed in the path of said magnetic tape, on opposite sides of said drum, said elements being axially askewed with respect to said drum, oppositely offset with respect to the division in said drum and each being disposed tangent to a plane tangent to said drum, the path of said magnetic tape having a portion extending along the circumference of each element for about 180°, said reels being disposed at substantially the same level and substantially at the same level as said division; and first and second cylindrical re-orientation elements disposed in the path of said magnetic tape, said first re-orientation element being disposed between said supply reel and said first equalizing element and tangent to a plane tangent to said first equalizing element, said second re-orientation element being disposed between said take-up reel and said second equalizing element and tangent to a plane tangent to said second equalizing element.

2. The magnetic tape guiding device as claimed in claim 1, wherein said first equalizing element and said first re-orientation element are parallel to each other and said second equalizing element and said second re-orientation element are parallel to each other.

* * * * *